United States Patent [19]

Pickering et al.

[11] Patent Number: 4,791,181

[45] Date of Patent: Dec. 13, 1988

[54] RATE-MODERATED GROUP TRANSFER POLYMERIZATION

[75] Inventors: Anthony Pickering, Warrington; Andrew J. Thorne, Chester, both of England

[73] Assignee: Imperial Chemical Industries PLC, London, England

[21] Appl. No.: 153,596

[22] Filed: Feb. 8, 1988

[30] Foreign Application Priority Data

Feb. 13, 1987 [GB] United Kingdom ............... 8703309

[51] Int. Cl.[4] ............................................. C08F 4/44
[52] U.S. Cl. ........................... 526/190; 526/194; 526/217; 526/262; 526/303.1; 526/307.7; 526/319; 526/320; 526/326; 526/327; 526/328; 526/329.7; 526/341; 526/342; 526/89
[58] Field of Search .............. 526/190, 194, 217, 262, 526/320, 326, 327, 328, 329.7, 341, 342, 319

[56] References Cited

U.S. PATENT DOCUMENTS 4,581,428 4/1986 Farnham et al. .............. 526/190
4,656,233 4/1987 Hertler et al. .............. 526/190

OTHER PUBLICATIONS

Banderman et al., "Group Transfer Polymerization of Methyl Methacrylate", Polym. Preprints 27 (1), 169–170 (1986).

*Primary Examiner*—Joseph L. Schofer
*Assistant Examiner*—F. M. Teskin
*Attorney, Agent, or Firm*—Cushman, Darby & Cushman

[57] ABSTRACT

A polymerization process which comprises contacting at least one polar acrylic type or maleimide monomer under polymerization conditions with (i) a tetracoordinate organosilicon, organotin or organogermanium initiator having at least one initiating site, (ii) a cocatalyst which is a source of fluoride, bifluoride, cyanide or azide ions or a Lewis acid, and (iii) from 0.1 to 10% by weight, based on the weight of monomer, of acetonitrile.

5 Claims, No Drawings

RATE-MODERATED GROUP TRANSFER POLYMERIZATION

This invention relates to a polymerisation process and more particularly to a process for polymerising polar olefinic monomers.

The group transfer polymerisation of acrylic type and maleimide monomers using certain organosilicon, organotin or organogermanium initiators and co-catalysts which are Lewis acids or sources of fluoride, bifluoride, cyanide or azide ions has been described in U.S. Pat. Nos. 4,414,372 and 4,417,034. The products are said to be "living" polymers by which is meant polymers which contain at least one active terminal group and are capable of polymerising further in the presence of monomer(s) and co-catalyst.

Whilst solvents are said to be not essential, it is acknowledged in the above mentioned patents that they are beneficial in controlling temperature during the exothermic polymerisations. In fact, in the absence of solvents, the rate of polymerisation is extremely high and hitherto the group transfer polymerisation technique has been of no practical value in bulk polymerisation processes.

It has now been found that the rate of polymerisation in group transfer polymerisation processes can be moderated sufficiently by the presence of relatively low concentrations of acetonitrile to enable bulk polymerisation to be carried out. By contrast, the rate of polymerisation cannot be satisfactorily controlled by merely reducing the concentration of the initiator or the catalyst.

Accordingly, the invention provides a polymerisation process which comprises contacting at least one polar acrylic type or maleimide monomer under polymerisation conditions with (i) a tetracoordinate organosilicon, organotin or organogermanium initiator having at least one initiating site, (ii) a co-catalyst which is a source of fluoride, bifluoride, cyanide or azide ions or a Lewis acid, and (iii) from 0.1 to 10% by weight, based on the weight of monomer, of acetonitrile.

Monomers which may be polymerised by the process of the invention include monomers of the formula:

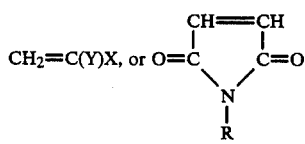

wherein:

X is CN, —CH=CHC(O)X' or —C(O)X';

Y is —H, —CH$_3$, —CN or —CO$_2$R, provided, however, when

X' is —CH=CHC(O)X', Y is —H or —CH$_3$;

X' is —OSi(R$^1$)$_3$, —R, —OR or —NR'R''; each R$^1$ independently is H or a hydrocarbyl radical which is an aliphatic, alicyclic, aromatic or mixed aliphatic-aromatic radical containing up to 20 carbon atoms, provided that at least one R$^1$ group is not H;

R is a hydrocarbyl radical which is an aliphatic, alicyclic, aromatic or mixed aliphatic aromatic radical containing up to 20 carbon atoms, or a polymeric radical containing at least 20 carbon atoms, any of said radicals optionally containing one or more ether oxygen atoms within aliphatic segments thereof and optionally containing one or more functional substituents that are unreactive under polymerising conditions, and optionally containing one or more reactive substituents of the formula:

—Z'(O)C—C(Y$^1$)=CH$_2$, wherein

Y$^1$ is H or CH$_3$ and Z' is O or NR'; and each of R' and R'' is independently selected from C$_{1-4}$ alkyl.

As indicated above in the definition of R in the formulas for the monomer, substituents having oxygen-nitrogen- or silicon-containing groups which are devoid of reactive hydrogen atoms under polymerizing conditions may be used. Groups such as OSi(R$^1$)$_3$ and CONH$_2$ are nonreactive under such conditions and therefore can be tolerated. On the other hand groups such as CO$_2$H and OH are reactive under polymerizing conditions. In order for monomers containing such groups on the R substituent to be useful in the invention process, the groups must be chemically protected, i.e. deactivated. Monomers containing such deactivated groups are useful in the preparation of polymers which upon treatment to remove the protective group, have functional sites along the polymer chain. Monomers which contain sufficiently sterically hindered amine and alcohol groups that remain inert under reactive conditions may be used directly without deactivation.

Examples of specific monomers which may be used in the process of the invention include methyl methacrylate, butyl methacrylate; sorbyl acrylate and methacrylate, lauryl methacrylate; ethyl acrylate; butyl acrylate, acrylonitrile; methacrylonitrile; 2-ethylhexyl methacrylate; 2-(dimethylamino)ethyl methacrylate; 2-(dimethylamino)ethyl acrylate; 3-methacryloxypropyl acrylate; 2-acetoxyethyl methacrylate; p-tolyl methacrylate; 2,2,3,3, 4,4,4-heptafluorobutyl acrylate; methylene malononitrile; ethyl 2-cyanoacrylate,N,N-dimethyl acrylamide, 4-fluorophenyl acrylate; 2-methylacryloxyethyl acrylate and linoleate; propyl vinyl ketone; ethyl 2-chloroacrylate; glycidyl methacrylate; 3-methoxypropyl methacrylate; 2[(1-propenyl)oxy]ethyl methacrylate and acrylate; phenyl acrylate; 2-(trimethylsiloxy)ethyl methacrylate, allyl acrylate; and methacrylate. Preferred monomers include methyl methacrylate; glycidyl methacrylate sorbyl methacrylate ethyl acrylate butyl acrylate; sorbyl acrylate; 2-(trimethylsiloxy)ethyl methacrylate; 2-methacryloxyethyl acrylate, 2-acetoxyethyl methacrylate and 2-(dimethylamino)ethyl methacrylate. Methyl methacrylate is especially preferred.

Mixtures of two or more monomers may be used if desired.

In order to produce high molecular weight products, it is advantageous to purify the monomer rigorously so as to reduce the levels of active hydrogen compounds, especially water and methanol, to below 5 ppm.

Tetracoordinate organosilicon, organotin or organogermanium initiators which may be used in the process of the invention include any of those disclosed in U.S. Pat. Nos. 4,414,372 and 4,417,034 or in European Patent publications Nos. 191641 and 194110, the disclosures of which are incorporated herein by reference.

Examples of specific initiators which are useful in the invention process include [(1-methoxy-2-methyl1-propenyl)oxy]trimethylsilane; 2-(trimethylsilyl)isobutyronitrile; ethyl 2-(trimethylsilyl)acetate: methyl 2-methyl-2-(tributylstannyl)propanoate, [(2-methyl-1- cyclohexenyl) oxy]tributylstannane; trimethylsilyl nitrile; methyl 2-methyl-2-(trimethylgermanyl)propanoate; [4,5-dihydro-2-furanyl)oxy]trimethylsilane; [(2-methyl-1-propenylidene)bis(oxy)]bis[-trimethylsilane]; [(2-methyl-1-[2-(methoxymethoxy)ethoxy]-1-propenyl-)oxy]trimethylsilane; methyl [(2-methyl-1-(trimethylsilyloxy)-1-propenyl)oxy]acetate; [(1-(methoxymethoxy)-2-methyl-1-propenyl)oxy]trimethylsilane; trimethyl a, a'''-bis(trimethylsilyl)-1,3,5-benzenediacetate; dimethyl a, a'-bis(trimethylsilyl)-1,3-benzenediacetate; [1,6-dimethoxy-1,5-hexadiene-1,6-diylbis(oxy)]bis[-trimethylsilane]; [(2-ethyl-1-propoxy-1-butenyl)oxy]ethyldimethylsilane; ethyl 2-(trimethylstannyl)propanoate [(1-cyclohexenyl)oxy]trimethylstannane [(2-methyl-1-butenylidene)bis(oxy)]bis[trimethylsilane]; 2-(trimethylsilyl)propanenitrile; ethyl(trimethylgermanyl)acetate; [(1-((1-dec-2-enyl)oxy)-2-methyl-1-propenyl)oxy]-trimethylsilane; phenyl 2-methyl-2-(tributylstannyl)-propanoate; methyl 2-(triethylsilyl)acetate; dimethyl 2,5-bis(trimethylgermanyl)hexanedioate; [(2-methyl-1-cyclohexenyl)oxy]tributylstannane; [(1-methoxy-2-methyl-1-propenyl)oxy]phenyldimethylsilane; and [(2-methyl-1-[2-(trimethylsiloxy)ethoxy]-1-propenyl)oxy]-trimethylsilane. Preferred initiators include[(1-methoxy-2-methyl-1-propenyl)oxy]trimethylsilane.

Suitable concentrations of initiator are generally such that the monomer/initiator molar ratio is greater than 1, preferably greater than 5.

The co-catalysts used in the invention process are either known compounds or can be prepared by known methods from known compounds. Suitable co-catalysts include zinc iodide, bromide, and chloride. mono- and dialkylaluminium halides, dialkylaluminium oxides, tris(dimethylamino)sulphonium difluorotrimethylsilicate, tris(dimethylamino)sulphonium cyanide, tris(-dimethylamino)sulphonium bifluoride, tetraphenylarsonium cyanide, tris(dimethylamino)sulphonium azide, tetraethylammonium azide, bis(dialkylaluminium)oxides, boron trifluoride etherate, alkali metal fluorides, bifluorides, cyanides, and azides, ammonium bifluoride, tris(dimethylamino)sulphoniumdifluorphenylstannate, tetrabutylammonium fluoride and bifluoride, tetramethylammonium fluoride and bifluoride tetraethylammonium cyanide and bifluoride and tetraphenylphosphonium bifluoride.

The co-catalyst is suitably present in an amount such that the molar ratio of initiator to co-catalyst is in the range 0.1 to 500, preferably 1 to 10.

The method of the invention may suitably be performed at temperatures in the range from 0° to 100° C. but is preferably performed at or about ambient temperature. In one preferred form of the invention, the monomer, or mixture of monomers, is added to a mixture of initiator, co-catalyst and acetonitrile in a suitable polymerisation vessel.

The "living" polymer obtained by the method of the invention may be converted to a non-living polymeric product by being contacted with an active hydrogen compound, for example water or an alcohol. The molecular weight of the product is substantially the theoretical molecular weight for a given set of conditions indicating that control of the polymerisation rate is not achieved by simply destroying the initiator, the living end or the catalyst.

The method of the invention is particularly useful for the bulk polymerisation of acrylics at room temperature, optionally in the presence of fillers, for the production of sheets, rods etc.

Dispersion type polyacrylates may also be prepared.

The invention is illustrated but not limited by the following Examples.

EXAMPLE 1

Polymerisation of methyl methacrylate (MMA) initiated by [(1-methoxy-2-methyl-1-propenyl)oxy]trimethylsilane (MTS) and tetraphenyl phosphonium bifluoride (TPPBF) in the presence of acetonitrile (MeCN)

4 mls of MMA (37.4 mmol) and 20 $\mu$l MTS (9.9×10$^{31}$ $^2$ mmol) were added to a dry flask under N$_2$. 4×100 $\mu$l aliquots of TPPBF solution in MeCN (0.0208 mmol/ml) were added to allow polymerisation to proceed at room temperature.

Polymerisation occurred in a controlled manner (i.e temperature did not exceed 100° C. with a consequential boiling off of monomer) over 20 mins. The polymer was dissolved in methylene chloride, reprecipitated into excess hexane, collected and dried in vac oven.

Conversion was 93.5% with Mn 30,490, Mw 46650, D1.53.

EXAMPLE 2

Production of a rod of poly MMA using MTS, TPPBF and MeCN as a rate modifier 3 mls of MMA (28.1 mmol) and 20 $\mu$l of MTS (9.9×10$^{-2}$ mmol) were added to a dry reaction tube (internal diameter 8 mm) under N$_2$. 4×50 $\mu$l aliquots of TPPBF in MeCN (0.0208 mmol/ml) were added. Eventually, polymerisation occurred indicated by a slight temperature rise (approx 50° C.) Polymerisation was allowed to proceed for ½ hour when almost complete solidification had occurred. A clear rod of poly MMA was thus produced Mn 43,000 Mw 56780, D.1.32.

EXAMPLE 3

Production of SiO$_2$ filled poly MMA using MTS TPPBF and MeCN as rate modifier.

3 mls of MMA (28.1 mmol), and 20 $\mu$l of MTS (9.9×10$^{-2}$ mmol) and 2 gm SiO$_2$ (Predried at 500° C. for 2 hours under N$_2$) were mixed in a reaction tube under N$_2$.

200 $\mu$l of TPPBF in MeCN (0.0208 mmol/ml) was now added.

Eventual polymerisation produced a rod of poly MMA filled with SiO$_2$ within ½ hour.

EXAMPLE 4

Production of poly MMA rod using MTS, tetrabutyl ammonium fluoride (TBAF) and MeCN as rate modifier 20 ml of MMA (187 mmol), 40 $\mu$l of MTS (19.8×10$^{-2}$ mmol) mixed in a dry tube under N$_2$). 250 $\mu$l of TBAF in MeCN (0.05 mmol/ml) was now added.

A slow controlled reaction occurred over 35 mins. Temperature reached 60° C. Polymer rod produced Mn 58,870 Mw 113957, D.1.94.

EXAMPLE 5

2ml of MMA and 10 $\mu$l of MTS were added to a dry flask under nitrogen. 100 $\mu$l of TBAF solution (0.05 m mol/ml) in MeCN were then added.

A controlled reaction was observed resulting in 96.2% conversion after 25 min giving a polymer having Mn 43,630, Mw 80,320 and D 1.84.

Using similar conditions but replacing the TBAF by (a) tetraethylammonium azide and (b) tetraethylammonium cyanide, the following results were obtained:

| Catalyst | Reaction time | % conversion | Mn | Mw | D |
|---|---|---|---|---|---|
| (a) | 30 min | 89.1 | 46,200 | 86,320 | 1.87 |
| (b) | 30 min | 85.5 | 51.300 | 86,700 | 1.67 |

No violent exotherm was observed

EXAMPLE 6

3 ml of butyl acrylate and 4 μl of MTS were added to a reaction vessel, 30 μl of MeCN were then added followed by 5 μl of a TBAF solution (0.1 m mol/ml) in MeCN.

The reaction temperature rose to 72° C. in 3 minutes giving 2.23 g of polymer, Mn 37,150, Mw 75,860 amd D 2.04.

EXAMPLE 7

1 ml of MMA and 30 μl of [(1-methoxy-2-methyl-1-propenyl))oxy]triphenylsilane were added to a clean dry vessel 100 μl of TBAF solution (0.1 molar in MeCN) were then added. No rapid reaction was observed but 83.3% conversion occurred in 20 mins giving a polymer Mn 80,874, Mw 416,555 and D 5.15.

In further preparations, the initiator was replaced by
(a) [(4,5-dihydro-2-furanyl)oxy]trimethylsilane
(b) [(2-methyl-1-[2-(trimethylsiloxy)ethoxy]-1-propenyl)oxy]trimethylsilane.

Again, there was no violent exotherm and the following results were obtained:

| Initiator | Reaction time | % conversion | Mn | Mw | D |
|---|---|---|---|---|---|
| (a) | 20 min | 67.0% | 25,200 | 280,000 | 4.2 |
| (b) | 20 min | 82.1% | 45,300 | 253,680 | 5.6 |

COMPARATIVE EXAMPLE

Two reactions tubes were charged with 5 ml of purified MMA and 20 μl of MTS under an atmosphere of nitrogen.

To one of the tubes was added 10 μl of TBAF (0.1 m mol/ml in tetrahydrofuran). An immediate exotherm was observed with consequential boiling of the monomer. The polymer was redissolved in methylene chloride and precipitated into hexane. The yield was assumed to be approximately 100%. Mn 112,580 Mw 187,640 D 1.67.

To the other tube was added 3 μl of the TBAF solution. Again, an immediate exotherm was observed but the reaction quickly eased giving a 2.7% conversion Mn 148,380, Mw 352,870, D 2.38

We claim:

1. A bulk polymerisation process which comprises contacting at least one polar acrylic or maleimide monomer under polymerisation conditions with (i) a tetracoordinate organosilicon, organotin or organogermanium initiator having at least one initiating site, (ii) a co-catalyst which is a source of fluoride, bifluoride, cyanide or azide ions or a Lewis acid, and (iii) from 0.1 to 10% by weight, based on the weight of monomer, of acetonitrile.

2. A process according to claim 1 wherein the monomer is of the formula:

$$CH_2=C(Y)X, \text{ or } O=C\underset{\underset{R}{N}}{\overset{CH=CH}{\diagup\diagdown}}C=O$$

wherein:
X is —CN, —CH=CHC(O)X' or —C(O)X';
Y is —H, —CH$_3$, —CN or —CO$_2$R, provided, however, when
X' is —CH=CHC(O)X', Y is —H or —CH$_3$;
X' is —OSi(R$^1$)$_3$, —R, —OR or —NR'R"; each R$^1$ independently is H or a hydrocarbyl radical which is an aliphatic, alicyclic, aromatic or mixed aliphatic-aromatic radical containing up to 20 carbon atoms, provided that at least one R$^1$ group is not H;
R is a hydrocarbyl radical which is an aliphatlc, alicyclic, aromatic or mixed aliphatic aromatic radical containing up to 20 carbon atoms, or a polymeric radical containing at least 20 carbon atoms, any of said radical optionally containing one or more ether oxygen atoms within aliphatic segments thereof and optionally containing one or more functional substituents that are unreactive under polymerizing conditions, and optionally containing one or more reactive substituents of the formula:

—Z'(O)C—C(Y$^1$)=CH$_2$ wherein
Y$^1$ is H or CH$_3$ and Z' is O or NR'; and
each of R' and R" is independently selected from C$_{1-4}$ alkyl.

3. A process according to claim 2 wherein the monomer is methyl methacrylate.

4. A process according to claim 3 wherein the moisture and methanol content of the methyl methacrylate is less than 5 ppm.

5. A process according to any one of claims 1 to 4 wherein the initiator is [(1-methoxy-2-methyl-1-propenyl)oxy]trimethylsilane.

* * * * *